United States Patent
Tsuchiya et al.

(10) Patent No.: US 10,471,869 B2
(45) Date of Patent: Nov. 12, 2019

(54) VEHICLE SEAT HAVING A CUSHION FRAME THAT MAINTAINS RIDE QUALITY

(71) Applicant: TOYOTA BOSHOKU KABUSHIKI KAISHA, Aichi (JP)

(72) Inventors: Norimitsu Tsuchiya, Aichi (JP); Akira Ishikawa, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/034,552

(22) Filed: Jul. 13, 2018

(65) Prior Publication Data

US 2019/0061582 A1 Feb. 28, 2019

(30) Foreign Application Priority Data

Aug. 28, 2017 (JP) ................. 2017-163292

(51) Int. Cl.
*B60N 2/68* (2006.01)
(52) U.S. Cl.
CPC .................... *B60N 2/686* (2013.01)
(58) Field of Classification Search
CPC .......... B60N 2/686; B60N 2/68; B60N 2/682
USPC .................................... 297/452.18
See application file for complete search history.

(56) References Cited

U.S. PATENT DOCUMENTS

| | | | | |
|---|---|---|---|---|
| 5,284,381 A * | 2/1994 | Aoki | ........................ | B60N 2/68 297/452.1 |
| 5,310,154 A * | 5/1994 | Ueda | ........................ | B60N 2/242 248/394 |
| 5,671,976 A * | 9/1997 | Fredrick | ................. | B60N 2/682 297/284.1 |
| 8,657,382 B2 * | 2/2014 | Eckenroth | .............. | B60N 2/686 297/452.1 |
| 9,327,631 B2 * | 5/2016 | Yamaguchi | .............. | B60N 2/68 |
| 2004/0227389 A1 * | 11/2004 | Yoshida | ................... | B60N 2/64 297/452.18 |
| 2006/0290180 A1 * | 12/2006 | Belair | ..................... | A47C 11/00 297/232 |
| 2015/0151659 A1 * | 6/2015 | Nasshan | ................ | B60N 2/682 297/452.18 |
| 2015/0343930 A1 * | 12/2015 | Yokoyama | ................ | B60N 2/68 297/316 |

FOREIGN PATENT DOCUMENTS

JP 2007-308021 11/2007

* cited by examiner

*Primary Examiner* — Milton Nelson, Jr.
(74) *Attorney, Agent, or Firm* — Greenblum & Bernstein, P.L.C.

(57) ABSTRACT

Provided is a vehicle seat that reduces deterioration in ride quality when an object is arranged under a seat cushion. The vehicle seat includes: a frame body; and a first panel having a first support portion and a second panel having a second support portion. The frame body includes: a first part extending along a seat width direction; and second and third parts arranged apart from each other and each extending toward a seat rear side relative to the first part. The first panel bridges the first and second parts. The second panel bridges the first and third parts. A distance from an inner end of the first support portion along the seat width direction to the second part is different from a distance from an inner end of the second support portion along the seat width direction to the third part.

3 Claims, 5 Drawing Sheets

VEHICLE SEAT HAVING A CUSHION FRAME THAT MAINTAINS RIDE QUALITY

CROSS-REFERENCE TO RELATED APPLICATIONS

This application claims the benefit of Japanese Patent Application No. 2017-163292 filed on Aug. 28, 2017 with the Japan Patent Office, the entire disclosure of which is incorporated herein by reference.

BACKGROUND

The present disclosure relates to a vehicle seat.

A vehicle seat provided, for example, in a rear seat area of an automobile comprises a seat cushion to form a seating surface and a cushion frame to support the seat cushion. The cushion frame generally has a symmetrical shape (see Japanese Unexamined Patent Application Publication No. 2007-308021).

Under the seat cushion of the vehicle seat arranged in the rear seat area, an object, such as a housing containing some components, is sometimes arranged. When the object is arranged under the seat cushion, an upper surface of the object serves as a frame to support a pad of the seat cushion. Accordingly, the cushion frame is arranged around the object when seen in a plan view.

SUMMARY

According to a conventional cushion frame, when the above-described object is arranged offset from a center of the vehicle in a width direction (that is, in a right-left direction), a distance in the right-left direction between the cushion frame and the object on a left side of the vehicle seat is different from that on a right side of the vehicle seat. That is, the distance between the cushion frame and the object is greater on the left side or the right side.

Thus, on the left side or the right side where the distance between the cushion frame and the object is greater, a space not supporting the seat cushion is widened, and a supported area of the seat cushion is reduced. As a result, the vehicle seat provides a deteriorated ride quality.

In one aspect of the present disclosure, it is preferable to provide a vehicle seat that allows reduction in deterioration of ride quality in a case where an object other than a cushion frame is arranged under a seat cushion.

One embodiment of the present disclosure is a vehicle seat that comprises a seat cushion and a cushion frame. The cushion frame supports the seat cushion. The cushion frame comprises a frame body, a first panel, and a second panel. The first panel comprises a first support portion, and the second panel comprises a second support portion. The first support portion and the second support portion support a seating surface of the seat cushion. The frame body comprises a first part, a second part, and a third part. The first part extends along a seat width direction. The second part and the third part are arranged apart from each other along the seat width direction, and each extend toward a seat rear side relative to the first part. The first panel bridges the first part and the second part. The second panel bridges the first part and the third part. When viewed in a cross section perpendicular to a seat front-rear direction, a distance from an inner end of the first support portion along the seat width direction to the second part is different from a distance from an inner end of the second support portion along the seat width direction to the third part.

With this configuration, it is possible to adjust a horizontal distance between the object and the first panel and a horizontal distance between the object and the second panel by configuring the first support portion and the second support portion, which support the seating surface of the seat cushion, to have respective different widths. Accordingly, it is possible to reduce a width of a space where the seat cushion is not supported, to thereby avoid deterioration of ride quality, while avoiding weight increase of the cushion frame.

In one embodiment of the present disclosure, the second part and the third part may be substantially symmetrical to each other with respect to a plane orthogonal to the seat width direction. With this configuration, the cushion frame may have a symmetrical appearance; thus, an increased productivity of the vehicle seat and an improved workability in assembly of the vehicle seat to the vehicle can be achieved.

In one embodiment of the present disclosure, the first panel may comprise a first fixing portion and a first extending portion. The first fixing portion may be located outward of the first support portion along the seat width direction and fixed to the second part. The first extending portion may be located on a seat front side of the first fixing portion and extending in a direction intersecting the seat width direction from the first fixing portion toward the first part and the second panel. The second panel may comprise a second fixing portion and a second extending portion. The second fixing portion may be located outward of the second support portion along the seat width direction and fixed to the third part. The second extending portion may be located on a seat front side of the second fixing portion and extending in a direction intersecting the seat width direction from the second fixing portion toward the first part and the first panel. With this configuration, as compared with a case where the first and second panels each extend along the frame body, a distance between a fixing position of the first panel to the first part and a fixing position of the first panel to the second part can be reduced, and a distance between a fixing position of the second panel to the first part and a fixing position of the second panel to the third part can be reduced. As a result, respective deflection amounts of the first and second panels are reduced, and thus respective deformation amounts of the first and second panels can be reduced when receiving an impact, for example, by a vehicle collision.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

1. Embodiment

[1-1. Configuration]

Figure 1:
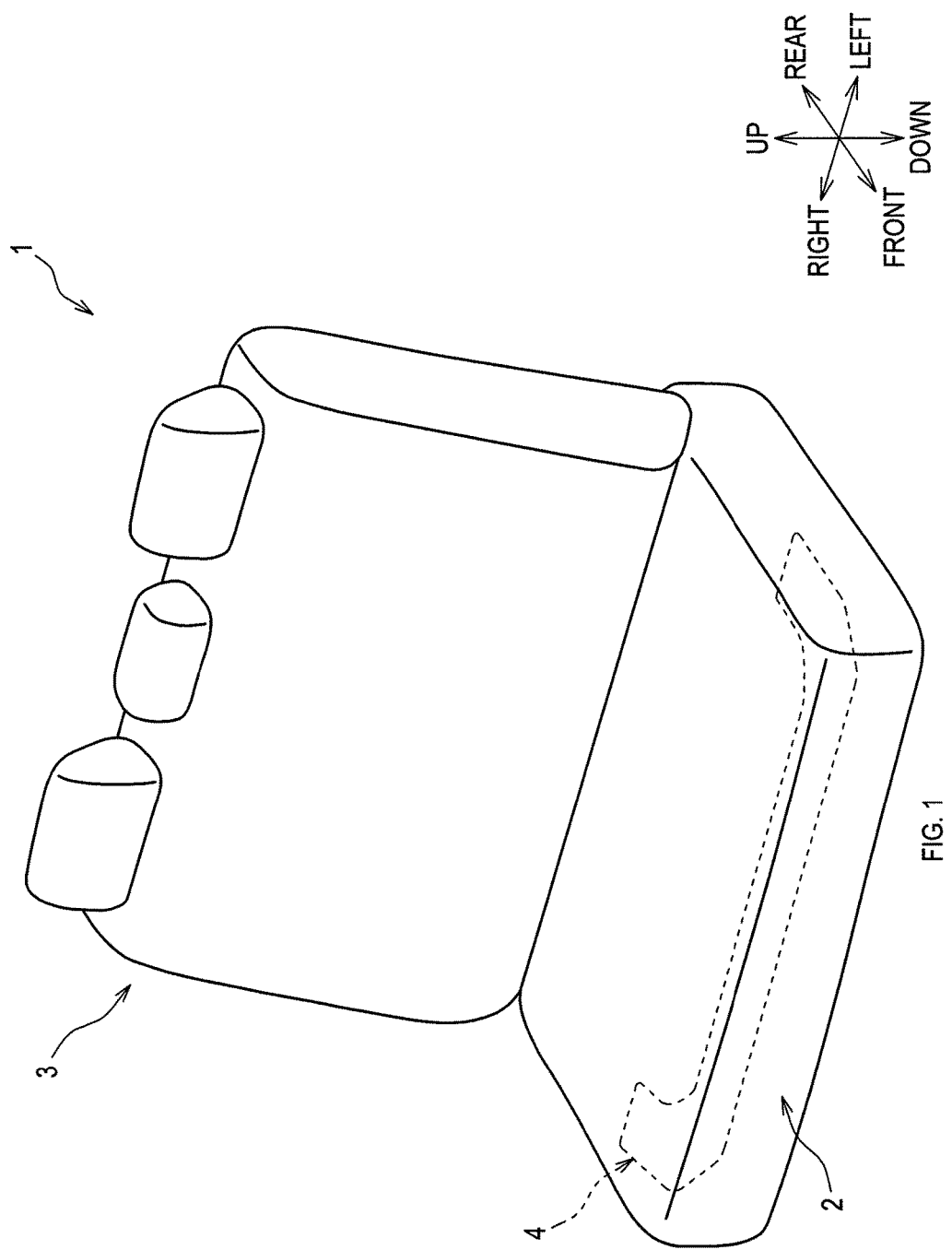
FIG. 1 is a schematic perspective view of a vehicle seat in the embodiment.

In FIG. 1, a vehicle seat 1 comprises a seat cushion 2, a seatback 3, and a cushion frame 4. The vehicle seat 1 of the present embodiment is configured to allow three occupants to be seated along a seat width direction.

The seat cushion 2 supports an occupant's buttocks. The seatback 3 supports the occupant's back. The cushion frame 4 supports the seat cushion 2.

The vehicle seat 1 of the present embodiment is used as a rear seat of a passenger car. Each direction in the description below and the drawings means a direction in a state where the vehicle seat 1 is assembled to a vehicle (that is, the passenger car). Also, in the present embodiment, the seat width direction coincides with a right-left direction of the vehicle, and a seat front side coincides with a front side of the vehicle.

<Cushion Frame>

As shown in FIG. 2 to FIG. 5, the cushion frame 4 comprises a frame body 41, a first panel 42, a second panel 43, a rod 44, an auxiliary bracket 45, and fixing brackets, namely a first fixing bracket 46A, a second fixing bracket 46B, a third fixing bracket 46C, a fourth fixing bracket 46D, a fifth fixing bracket 46E, and a sixth fixing bracket 46F.

<<Frame Body>>

Figure 2:
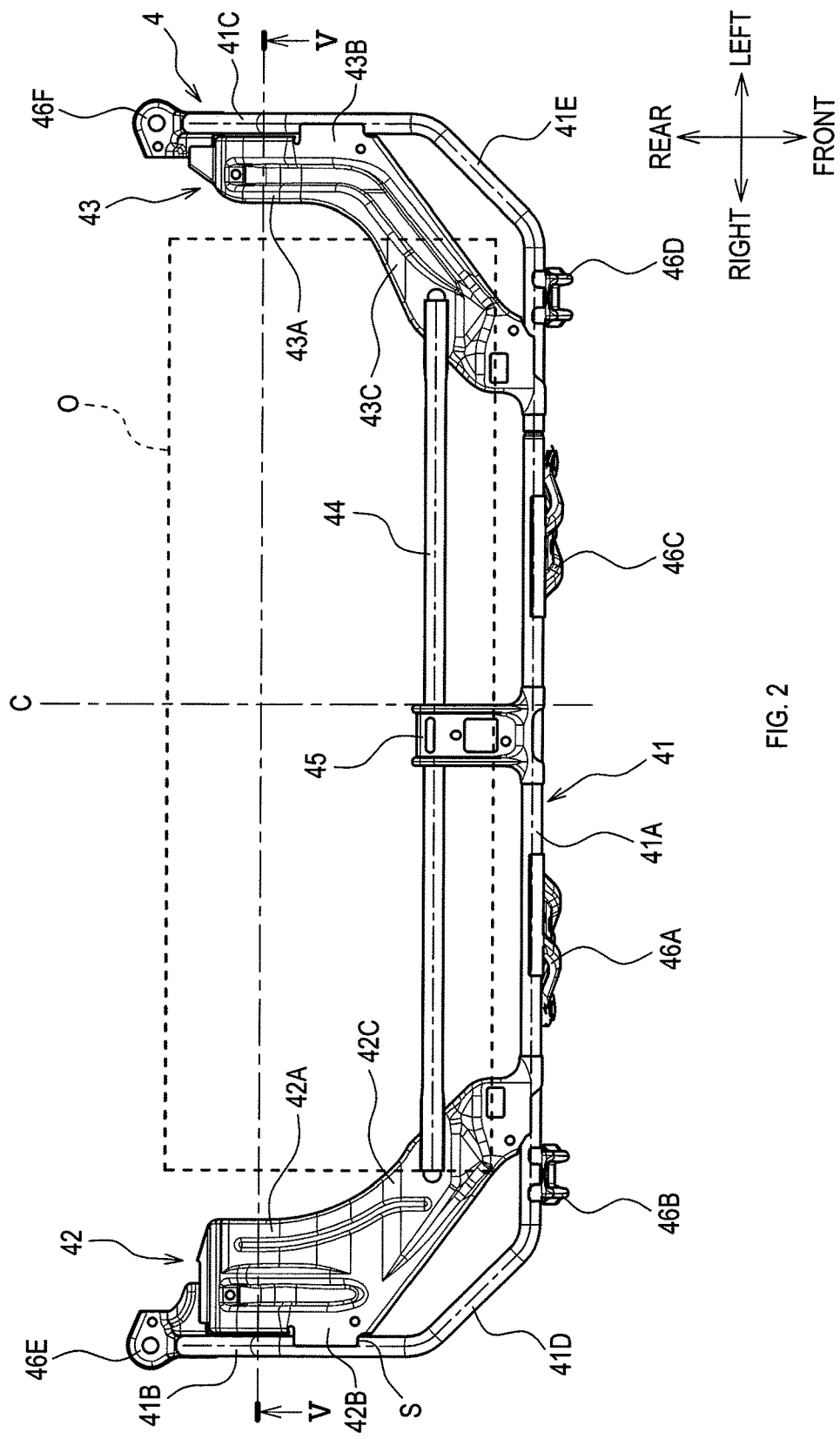
FIG. 2 is a schematic plan view of a cushion frame in FIG. 1 when viewed from above.

As shown in FIG. 2, the frame body 41 is a tubular body formed by coupling two partially curved pipes along a longitudinal direction. However, the frame body 41 may be configured with a single member (unitary construction), or may be a solid rod-like body.

The frame body 41 comprises a first part 41A, a second part 41B, a third part 41C, a right coupling portion 41D, and a left coupling portion 41E.

The first part 41A extends along the seat width direction, and may include a pipe joint. The second part 41B is coupled to a first end, on a right side, of the first part 41A through the right coupling portion 41D. Also, the third part 41C is coupled to a second end, on a left side, of the first part 41A through the left coupling portion 41E.

The second part 41B and the third part 41C are arranged apart from each other along the seat width direction. Also, the second part 41B and the third part 41C each extend rearward of the seat relative to the first part 41A along a seat front-rear direction. In other words, an extending direction of each of the second part 41B and the third part 41C (that is, a central axis direction) is orthogonal to an extending direction of the first part 41A.

Figure 4:
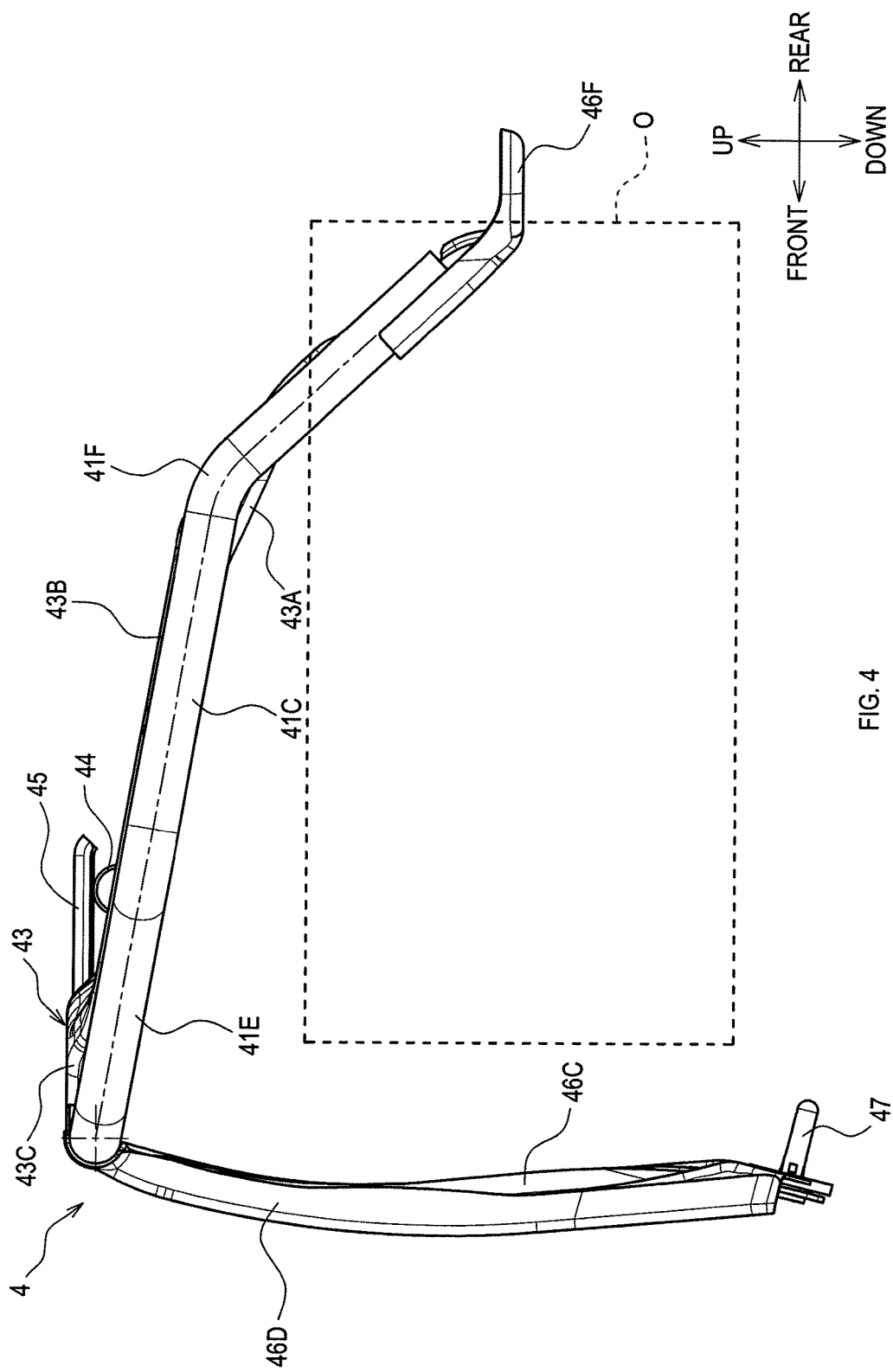
FIG. 4 is a schematic side view of the cushion frame in FIG. 2 when viewed from a left side.

Also, as shown in FIG. 4, the third part 41C extends from the upper front of the seat toward the lower rear of the seat. That is, the third part 41C is arranged such that its extending direction is inclined relative to a horizontal direction. Similarly, the second part 41B also extends from the upper front of the seat toward the lower rear of the seat. The second part 41B and the third part 41C are preferably arranged to overlap each other when viewed in the seat width direction. In other words, the second part 41B and the third part 41C are mirror images.

Further, the second part 41B and the third part 41C each comprise a respective curved portion 41F in a central part along the seat front-rear direction. The second part 41B and the third part 41C are each configured to have a greater inclination angle relative to the horizontal direction in a region rearward of the curved portion 41F than an inclination angle relative to the horizontal direction in a region forward of the curved portion 41F.

The second part 41B and the third part 41C are substantially symmetrical to each other (i.e., substantially mirror images of each other) with respect to a plane orthogonal to the seat width direction. Also, the second part 41B and the third part 41C are arranged at a same distance from a center line of the cushion frame 4 along the seat width direction.

As shown in FIG. 2, the right coupling portion 41D extends right rearward from the first end of the first part 41A and is coupled to the second part 41B. The left coupling portion 41E extends left rearward from the second end of the first part 41A and is coupled to the third part 41C.

<<First Panel and Second Panel>>

Figure 5:
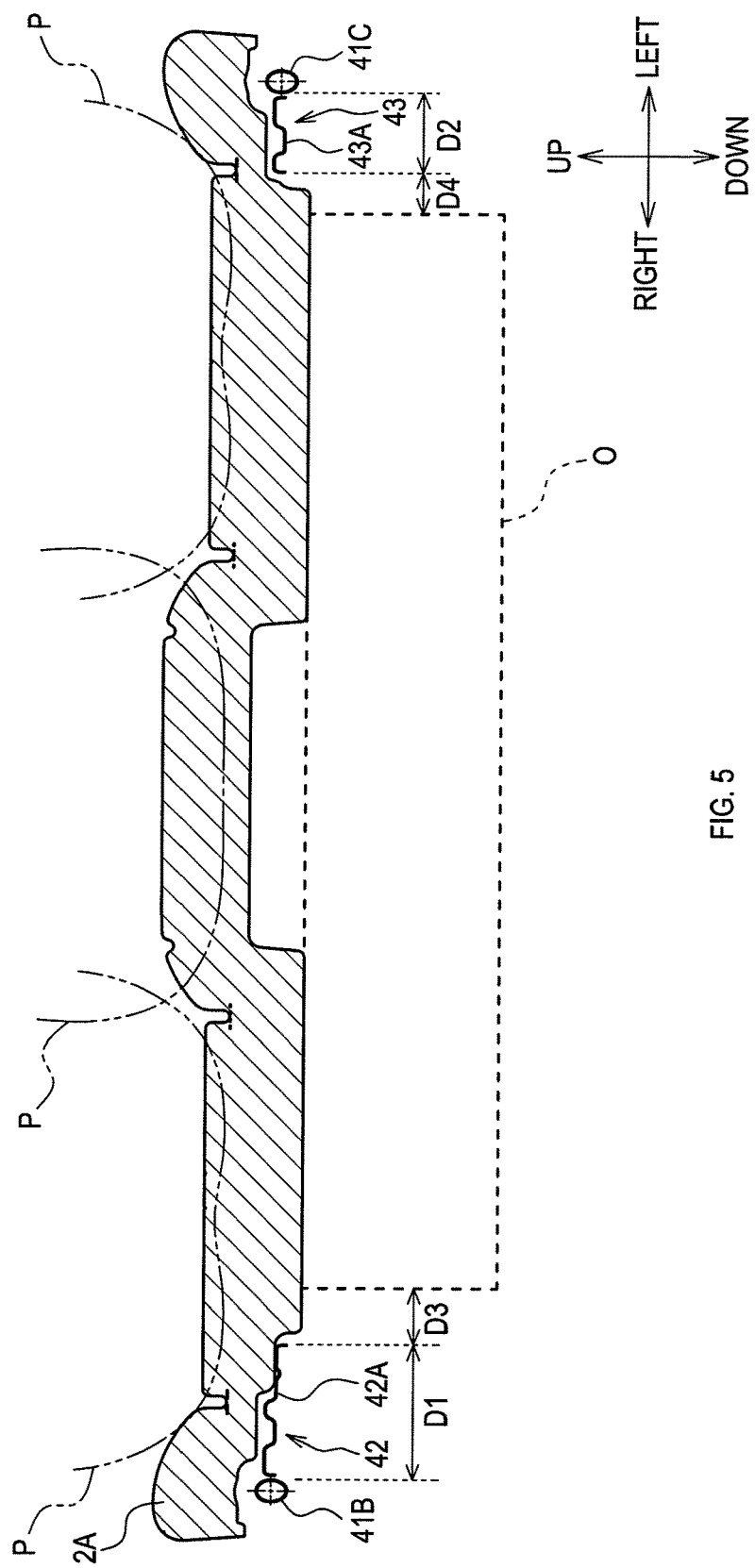
FIG. 5 is a schematic sectional view along a line V-V in FIG. 2.

Each of the first panel 42 and the second panel 43 is a strip-shaped member configured to support a pad 2A of the seat cushion 2 shown in FIG. 5.

As shown in FIG. 2, the first panel 42 is arranged to bridge the first part 41A and the second part 41B of the frame body 41. The second panel 43 is arranged to bridge the first part 41A and the third part 41C of the frame body 41 at a position apart from the first panel 42 along the seat width direction.

Also, as shown in FIG. 4, at least a part of the second panel 43 including a below-described support portion 43A extends rear downward of the seat from a coupling portion with the first part 41A along the third part 41C of the frame body 41. Similarly to a mirror image of the second panel 43, the first panel 42 extends rear downward of the seat from a coupling portion with the first part 41A along the second part 41B of the frame body 41. The first panel 42 and the second panel 43 each comprise at least one rib (such as a convex portion or a concave portion) extending along the seat front-rear direction in order to obtain an increased strength. However, the first panel 42 and the second panel 43 may have different widths and different rib shapes.

As shown in FIG. 2, the first panel 42 comprises a support portion 42A, a fixing portion 42B, and an extending portion 42C.

The support portion 42A supports a seating surface of the seat cushion 2. Specifically, as shown in FIG. 5, the support portion 42A vertically overlaps a surface, which buttocks of an occupant P abut, of the pad 2A of the seat cushion 2. In the present embodiment, as shown in FIG. 2, the seating surface, which buttocks abut, of the seat cushion 2 is formed at an area rearward from a seat frontmost point S of the below-described fixing portion 42B (that is, a portion where the first panel 42 and the second part 41B are fixed together).

The fixing portion 42B is located outward from the support portion 42A along the seat width direction and is fixed to the second part 41B. In the present embodiment, as shown in FIG. 2, the fixing portion 42B is provided rightward of the support portion 42A and extends outward of the cushion frame 4 along the seat width direction. The fixing portion 42B is fixed to an outer peripheral surface of the second part 41B, for example, by welding along a longitudinal direction of the second part 41B.

The extending portion 42C is located on a seat front side of the support portion 42A and the fixing portion 42B, and extends in a direction intersecting the seat width direction (specifically, a seat left front direction) from the support portion 42A and the fixing portion 42B toward the first part 41A and the second panel 43.

The extending portion 42C comprises an end (that is, a seat front end), which is opposite to the support portion 42A and the fixing portion 42B, fixed to (and supported by) an outer peripheral surface of the first part 41A of the frame body 41, for example, by welding. The extending portion 42C of the first panel 42 has a shorter length along the seat width direction (that is, a width) than a length of the support portion 42A.

The first panel 42 is fixed to the frame body 41 only through the seat front end of the extending portion 42C in an area on a seat front side of the fixing portion 42B. In other words, the extending portion 42C is not fixed to the frame body 41 except at the seat front end thereof.

The second panel 43 comprises a support portion 43A, a fixing portion 43B, and an extending portion 43C.

The support portion 43A supports the seating surface of the seat cushion 2. The support portion 43A of the second panel 43 has substantially an inverted shape of the support portion 42A of the first panel 42 along the seat width direction. However, the support portion 42A of the first panel 42 and the support portion 43A of the second panel 43 are different in length along the seat width direction.

As shown in FIG. 5, in an optional section that passes through the seating surface of the seat cushion 2 and is orthogonal to the seat front-rear direction, a (first) distance D1 along the seat width direction from an inner end of the support portion 42A of the first panel 42 along the seat width direction to the second part 41B is different from a (second) distance D2 along the seat width direction from an inner end of the support portion 43A of the second panel 43 along the seat width direction to the third part 41C.

In the present embodiment, as shown in FIG. 2, an object O is arranged under the seat cushion 2 such that a center line C of the seat width direction of the object O is offset leftward from a center of the seat cushion 2 (that is, arranged to be closer to the second panel 43). Thus, to accommodate the offset object O, the distance D1 of the first panel 42, which is more distant than the second panel 43 from the center line C of the seat width direction of the object O is greater than the distance D2 of the second panel 43. Also, when seen in a plan view, the support portion 42A of the first panel 42 has a surface area greater than a surface area of the support portion 43A of the second panel 43, and thus supports more of the seat cushion 2.

Further, an inner end of the support portion 42A of the first panel 42 along the seat width direction is positioned inward from the first end (i.e., the right end) of the first part 41A of the frame body 41 along the seat width direction. In contrast, an inner end of the support portion 43A of the second panel 43 is positioned outward from, the second end (i.e., the left end) of the first part 41A along the seat width direction.

As a result, a separation distance D3 (along the seat width direction between the support portion 42A of the first panel 42 and the object O) and a separation distance D4 (along the seat width direction between the support portion 43A of the second panel 43 and the object O) can be substantially equal. The object O may be, for example, a battery or a battery housing.

The fixing portion 43B and the extending portion 43C of the second panel 43 may be approximate mirror images of the fixing portion 42B and the extending portion 42C of the first panel 42 relative to a plane that is orthogonal to the seat width direction. Specifically, the fixing portion 43B is located outward of the support portion 43A along the seat width direction and is fixed to the third part 41C. The extending portion 43C is located on a seat front side of the support portion 43A and the fixing portion 43B, and extends in a direction intersecting the seat width direction (specifically, a seat right front direction) from the support portion 43A and the fixing portion 43B toward the first part 41A and the first panel 42.

<<Rod and Auxiliary Bracket>>

The rod 44 is a pipe extending along the seat width direction. The rod 44 couples (and is supported by) the extending portion 42C of the first panel 42 and the extending portion 43C of the second panel 43.

The auxiliary bracket 45 is a member to support the rod 44. The auxiliary bracket 45 is fixed to a central portion along the seat width direction of the first part 41A of the frame body 41. As shown in FIG. 4, the rod 44 is fixed to a lower surface of the auxiliary bracket 45.

<<Fixing Brackets>>

Figure 3:
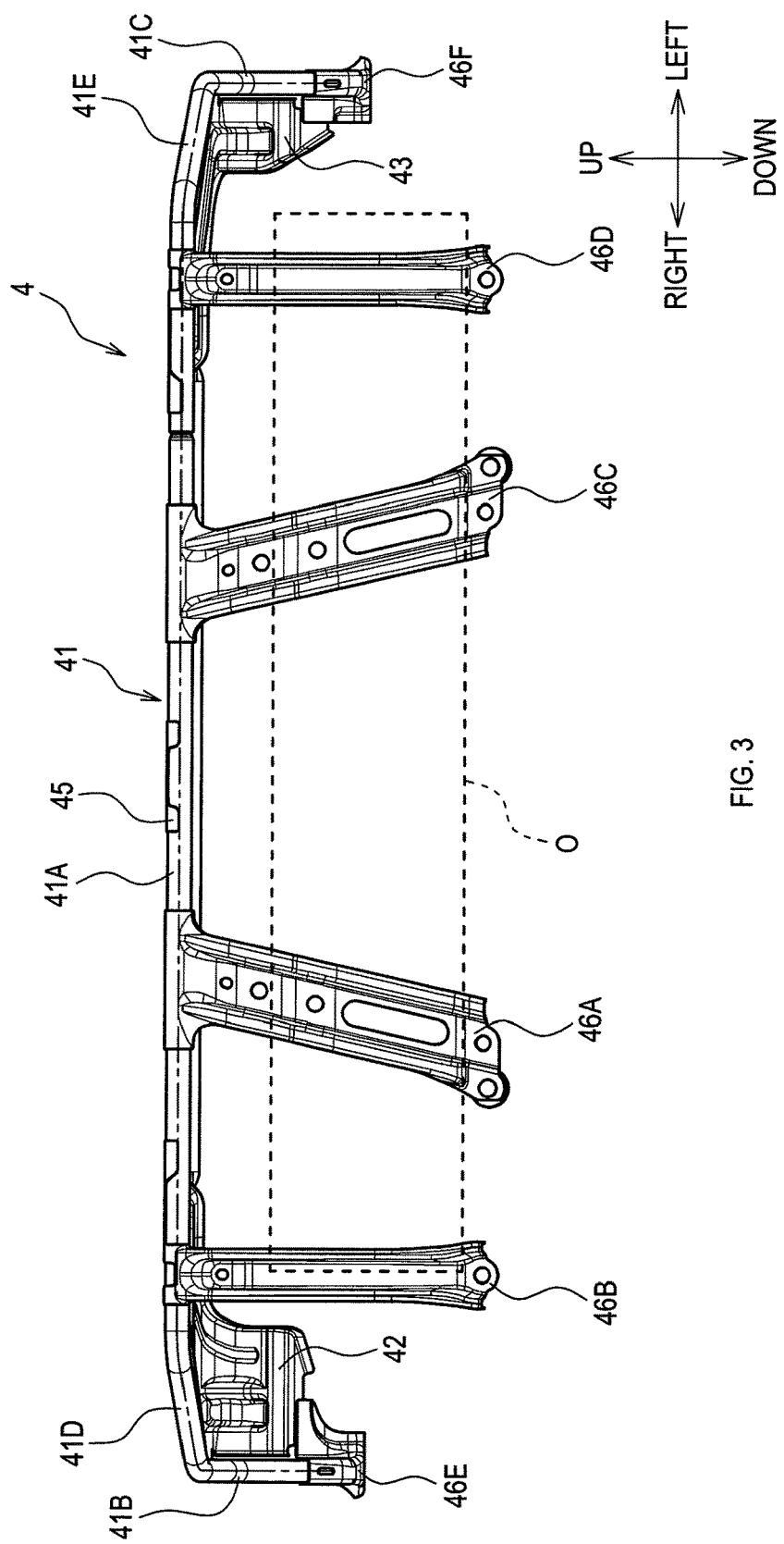
FIG. 3 is a schematic front view of the cushion frame in FIG. 2 when viewed from a front.

As shown in FIG. 3, the first to fourth fixing brackets 46A, 46B, 46C, and 46D are each mounted to the first part 41A of the frame body 41. The first to fourth fixing brackets 46A, 46B, 46C, and 46D each extend downward from the first part 41A and have a lower end fixed to a vehicle body with a respective bolt 47, as shown in FIG. 4 for the third fixing bracket 46C.

As shown in FIG. 2, the fifth fixing bracket 46E is mounted to a seat rear end of the second part 41B of the frame body 41, and the sixth fixing bracket 46F is mounted to a seat rear end of the third part 41C of the frame body 41. Also, as shown in FIG. 3, the fifth fixing bracket 46E is coupled to the first panel 42 and the sixth fixing bracket 46F is coupled to the second panel 43. The fifth and sixth fixing brackets 46E, 46F are fixed to the vehicle body.

[1-2. Effects]

According to the embodiment detailed as above, the following effects can be obtained.

(1a) A separation distance D3 between the object O and the first panel 42 and a separation distance D4 between the object O and the second panel 43 can be adjusted by configuring the support portion 42A of the first panel 42 and the support portion 43A of the second panel 43, which support the seating surface of the seat cushion 2, to have respective different widths. Accordingly, it is possible to reduce a width of a space where the seat cushion 2 is not supported, to thereby avoid deterioration of ride quality, while avoiding weight increase of the cushion frame 4.

(1b) An increased productivity of the vehicle seat 1 and an improved workability in assembly of the vehicle seat 1 to the vehicle can be achieved by configuring the first panel 42 and the second panel 43 to be asymmetrical to each other, thereby defining the first distance D1 as not equal to the second distance D2, and by configuring the frame body 41 to be symmetrical.

(1c) By fixing the first panel 42 and the second panel 43 to the frame body 41 through the respective fixing portions 42B, 43B and the respective extending portions 42C, 43C, a distance between a fixing position of the first panel 42 to the first part 41A and a fixing position of the first panel 42 to the second part 41B can be reduced, and a distance between a fixing position of the second panel 43 to the first part 41A and a fixing position of the second panel 43 to the third part 41C can be reduced. As a result, deflection amounts of the first and second panels 42, 43 are reduced, and thus deformation amounts of the first and second panels 42, 43 can be reduced when receiving an impact, for example, by a vehicle collision.

2. Other Embodiments

Although one embodiment of the present disclosure has been described above, it is to be understood that the present disclosure is not limited to the embodiment above, but may be implemented in various forms.

(2a) In the vehicle seat 1 of the above-described embodiment, the distance D1 from the inner end of the of the first panel 42 along the seat width direction to the second part 41B need not be greater than the distance D2 from an inner end of the support portion 43A of the second panel 43 along the seat width direction to the third part 41C. For example, when the object O is arranged to be deviated rightward, the (first) distance D1 is configured to be smaller than the (second) distance D2.

(2b) In the vehicle seat 1 of the above-described embodiment, the second part 41B and the third part 41C of the frame body 41 need not be symmetrical to each other with respect to a plane orthogonal to the seat width direction. In other words, the frame body 41 need not have a symmetrical shape.

(2c) In the vehicle seat 1 of the above-described embodiment, the first panel 42 need not comprise the fixing portion 42B or the extending portion 42C, and the second panel 43 need not comprise the fixing portion 43B or the extending portion 43C. In other words, the first panel 42 and the second panel 43 may be each fixed to the frame body 41 at a position other than that described in the above-described embodiment.

(2d) The vehicle seat 1 of the above-described embodiment may also be applied to a seat for use in automobiles other than passenger cars, or in any vehicles other than automobiles, such as railway vehicles, ships and boats, and aircrafts.

(2e) It may be possible to divide a function performed by one element in the above-described embodiments to a plurality of elements, or to integrate functions of a plurality of elements into one element. Also, the configurations in the above-described embodiments may be partly omitted. Further, at least a part of a configuration in the above-described embodiments may be added to, or may replace, another configuration of the above-described embodiments. Any form that falls within the scope of the technical ideas defined by the language of the appended claims may be an embodiment of the present disclosure.

What is claimed is:

1. A vehicle seat comprising:
   a seat cushion; and
   a cushion frame supporting the seat cushion,
      the cushion frame comprising:
         a frame body;
         a first panel comprising a first support portion; and
         a second panel comprising a second support portion,
            wherein the first support portion and the second support portion support a seating surface of the seat cushion,
   wherein the frame body comprises:
      a first part extending along a seat width direction; and
      a second part and a third part arranged apart from each other along the seat width direction and each extending toward a seat rear side relative to the first part,
   wherein the first panel bridges the first part and the second part,
   wherein the second panel bridges the first part and the third part, and
   wherein, when viewed in a cross section perpendicular to a seat front-rear direction, a distance from an inner end of the first support portion along the seat width direction to the second part is different from a distance from an inner end of the second support portion along the seat width direction to the third part.

2. The vehicle seat according to claim 1, wherein the second part and the third part are substantially symmetrical to each other with respect to a plane orthogonal to the seat width direction.

3. The vehicle seat according to claim 1,
   wherein the first panel comprises:
      a first fixing portion located outward of the first support portion along the seat width direction and fixed to the second part; and
      a first extending portion located on a seat front side of the first fixing portion and extending in a direction intersecting the seat width direction from the first fixing portion toward the first part and the second panel, and
   wherein the second panel comprises:
      a second fixing portion located outward of the second support portion along the seat width direction and fixed to the third part; and
      a second extending portion located on a seat front side of the second fixing portion and extending in a direction intersecting the seat width direction from the second fixing portion toward the first part and the first panel.

* * * * *